Aug. 12, 1952 J. BLACK 2,606,340
DEHORNING SHEAR APPARATUS
Filed Jan. 24, 1947
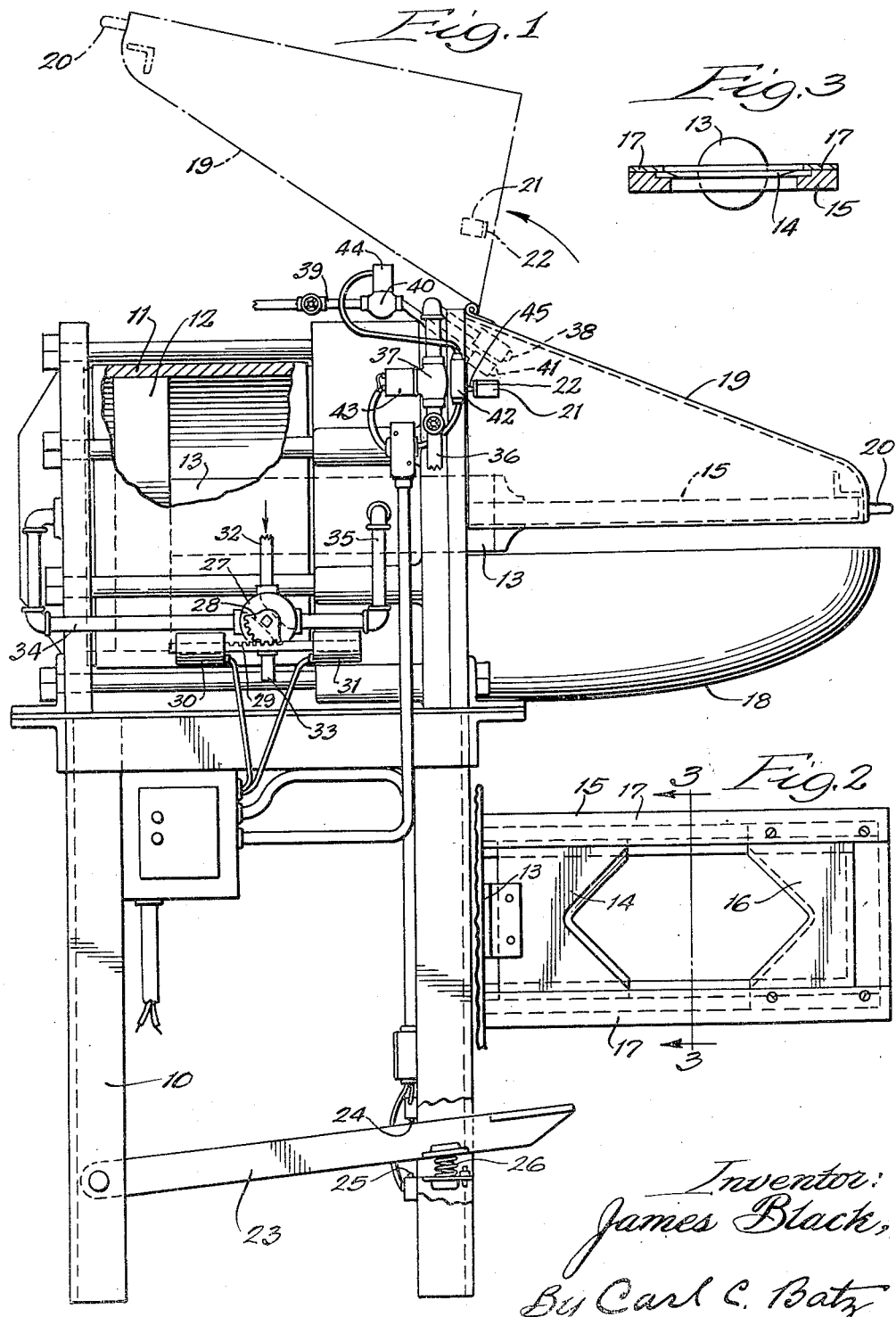
Inventor:
James Black,
By Carl C. Batz
Attorney.

Patented Aug. 12, 1952

2,606,340

UNITED STATES PATENT OFFICE 2,606,340

DEHORNING SHEAR APPARATUS

James Black, Chicago, Ill., assignor to Armour and Company, Chicago, Ill., a corporation of Illinois Application January 24, 1947, Serial No. 724,018

12 Claims. (Cl. 17—1)

This invention relates to shear apparatus, and more particularly to apparatus useful in the removal of the horn or horn-bearing portion of the head of cattle and the like.

The removal of horns from the head of a slaughtered animal has heretofore been done largely by hand or by powered saws, an extremely arduous and expensive operation. An automatic machine has been considered unsatisfactory because contamination of the apparatus by diseased heads renders it ineffective and requires extensive cleaning and sterilizing steps. Should the apparatus be heated by hot water to sterilize it, the contact with the heated metal surfaces of blood, etc., coagulates the blood and provides a mass that builds up on the operated parts and renders the machine unsightly and extremely difficult to clean.

An object of the present invention is to provide shearing apparatus which quickly removes the horns or the horn-bearing portions of the skull, while at the same time providing means for effectively cleaning and sterilizing the device after each head-treating operation without producing a coagulation of blood. Yet another object is to provide in combination with shearing mechanism, heating and cooling mechanism for cleaning and sterilizing the apparatus at this operating point while immediately cooling such parts to prevent the accumulation of blood thereon when the next head is presented. Yet another object is to provide power mechanism for operating horn-removing cutting means while providing a hood for enclosing the area to be sterilized and means for cooling such area after the sterilizing operation. Yet another object is to provide improved apparatus whereby the skull-bearing portion of the animal is removed while simultaneously removing the hide portions normally attached thereto. Other specific objects and advantages will appear as the specification proceeds.

The invention is illustrated, in a preferred embodiment, by the accompanying drawing, in which—

Figure 1 is a side view in elevation of apparatus embodying my invention; Fig. 2, a top plan view of the cutting apparatus used; and Fig. 3, a vertical sectional view, the section being taken as indicated at line 3—3 of Fig. 2.

In the illustration given, 10 designates a frame which may be of any suitable type or structure. Upon the frame 10 is mounted a power cylinder 11. It will be understood that instead of employing a compressed air cylinder, any other suitable power means may be used. In the cylinder 11 is mounted a piston 12, and a piston rod or shaft 13 extends forwardly and is secured to a movable cutting blade or knife 14.

Extending forwardly of the frame 10 and in line with the piston rod 13 is a perimetric frame member 15 having a longitudinal opening therein. At one end of the opening is secured a fixed knife 16. In the other end of the opening is the slidably-mounted knife 14. If desired, the frame 15 may be covered with a sheet metal strip 17, as shown more clearly in Fig. 3.

Below the member 15 is supported a hopper 18 which may be provided with a laterally-extending chute (not shown) for directing horns, etc., into any suitable conveyor. It will be understood that the hopper structure will be varied as desired to meet the requirements of the slaughter house.

Hinged to the top of the frame 10 is a hood 19 which is adapted to move downwardly and enclose the member 15, as shown best in Fig. 1. The hopper thus encloses the frame portion which provides the horn-receiving opening and the mechanism for removing the horn or base portion of the skull. The hood 19 is provided at its forward end with a handle 20 and, in actual operation, it will be understood that suitable latching mechanism may be used. If desired, the hood may be spring-urged to the upper position shown in Fig. 1 and may be drawn to a latched lower position by any suitable means. The hood is provided near its rear upper side with a metal strap 21 providing a laterally-extending flange 22. The flange 22 is used as a means for controlling the flow of fluid, as will be later described.

In the lower portion of the frame, I provide a pivoted treadle member 23 which is employed for operating the power cylinder 11. On the upper side of the treadle member 23 is a spring-urged contact 24 and on the lower side is a similar contact 25. A spring 26 normally urges the treadle 23 to upper position so that the contact plunger 24 is actuated. The purpose of the contacts 24 and 25 is to actuate solenoids for the control of a compressed air valve.

The compressed air valve 27 is of a rotary type and is actuated by a sector gear 28 mounted on the valve shaft. Meshing with the gear 28 is a rack 29. The ends of the rack 29 extend within solenoids 30 and 31. Compressed air enters the valve 27 through pipe 32 and a vent pipe is provided at 33. Compressed air passes through line 34 to the rear portion of the cylinder 11 to produce the power stroke, while compressed air enters the forward end of the piston through pipe 35 to retract the piston and the movable knife 14. A hot water pipe 36 leads through the solenoid-controlled valve 37 to a spray nozzle 38. A cold water pipe 39 leads through the solenoid-controlled valve 40 to the spray nozzle 41. A double-acting contact member 42, when depressed, actuates the solenoid 43 controlling valve 37, and when released from compression operates the solenoid 44 controlling the valve 40. The control member 42 is provided with a plunger 45 and is adapted to be actuated by the flange 22 of the hood 19.

*Operation*

In the operation of the apparatus, the hood 19 is raised to the position shown in Fig. 1 and the animal head is placed so that the horn extends through the opening between knives 14 and 16, as shown best in Fig. 2. The treadle 23 is then depressed so as to make the contact at 25. This actuates the solenoid valve so as to cause a flow of compressed air through line 34 to the rear of cylinder 11. The air forces the piston rod 13 forwardly, and the knife 14 advances and cuts away the horn or portion of the skull bearing the horn. Release of the treadle 23 causes the contact 24 to be actuated, and the solenoid-controlled valve 27 is rotated to close off the flow of air through pipe 34 and to allow the same to vent through pipe 33 while establishing communication between line 32 and pipe 35, the valve structure showing this flow passage being shown in dotted lines in Fig. 1. Compressed air thus enters the forward end of the cylinder and forces the piston 12 to its original rear position, as indicated in Fig. 1. By this operation, the knife 14 is retracted. The head may then be turned to bring the other horn-bearing portion into the opening between the knives and the cutting operation repeated by pressing upon treadle 23.

After the shearing operation described, the hood 19 is drawn to closed position, as shown in solid lines in Fig. 1, and this operation brings the flange 22 against the contact 45 of the member 42. Solenoid 43 is thus actuated and valve 37 is opened to allow the flow of hot water or other sterilizing fluid through the spray nozzle 38. Within an extremely short time, the hot sterilizing liquid thoroughly cleanses the apparatus and sterilizes the surfaces. The hood 19 is raised to the position shown in Fig. 1 and this action releases the contact between the flange 22 and the contact 45. The contact-actuating solenoid 43 is thus broken and a contact is made energizing solenoid 44. Hot water ceases to flow and the valve 40 in the cold water line 39 is opened so that cold water flows outwardly and onto the metal surfaces below. The cold water serves as a cooling medium so that the metal surfaces are restored to a temperature below that which coagulates blood. Thus when the next head is brought to the machine, there is no tendency for the blood or other material to stick to or build upon the metal surfaces.

In the normal operation of the device, I prefer to have the hot water or other sterilizing fluid brought into effect and in relatively large volume while the hood is lowered, the cooling fluid being caused to flow onto the apparatus at all times while the hood is raised. However, it will be understood that any suitable means may be employed for timing the flow of the liquids to produce the sterilizing and chilling steps. Further, the use of master control valves enables the hot and cold water lines to be cut off manually as desired.

In actual practice, the apparatus shown enables the horns to be removed with great rapidity, the sterilizing and chilling steps being accomplished quickly through the use of the hood 19, while at the same time the passage of diseased heads through the line does not in any way contaminate or render the apparatus unsatisfactory. The heads are treated successively, irrespective of their being diseased or not diseased, and the diseased heads are later removed from the line by a government meat inspector.

In the skinning operation, it is found extremely difficult to remove portions of the skin around the horns and, as a result, hand operations are later required. I have found that by arranging the knives as shown in the drawing so that the opening receives the portion of the head around the horn, that the removal of the skull portions at this point effectively removes such skin portions and obviates the manual trimming operation. At the same time, by severing the skull portions rather than the horn, I find that a relatively uniform power stroke is required and that the machine operation is more effective.

In the operation of the valves controlling the compressed air, I prefer that the timing of the valves admit compressed air to the end of the cylinder toward which the piston is advancing near the end of the stroke so that there will be an air cushioning effect. It will be understood, however, that any suitable power cylinder may be employed.

If desired, a spring or weight may be employed to urge the hood 19 toward its raised position, as illustrated in Fig. 1, the hood being held in lowermost position by a releasable latch. It will be understood that the structure may be modified as to its details widely depending upon the specific requirements of the particular plant.

While in the foregoing specifications, I have set forth a single embodiment of the invention in considerable detail, it will be understood that the details of such structure are given for the purpose of illustration only and may be varied widely by those skilled in the art without departing from the spirit of my invention.

I claim:

1. In apparatus for dehorning cattle heads and the like, a frame providing an opening adapted to receive the horn-bearing portion of the head, shearing means mounted for reciprocation across said opening, a hood mounted on said frame for movement into position about said head-receiving area and away from said area, nozzles carried by said frame for discharging hot water and cooling water upon said area, means on said frame and actuated by the lowering of said hood for supplying hot water to the hot water nozzle, and means controlled by the raising of the hood for supplying cooling water to the other nozzle after the discharge of said hot water.

2. An apparatus for dehorning cattle heads and the like, a frame providing an opening adapted to receive the horn-bearing portion of the head, cutting means mounted for reciprocation across said opening, a hood mounted on said frame for movement to a position in which it encloses said opening and for movement away from said opening, valve-controlled means on said frame for discharging hot water upon said cutting means when said hood is in said enclosing position, and cooling means on said frame for maintaining said cutting means at a temperature below that for effecting the coagulation of blood.

3. In apparatus for dehorning cattle heads and the like, a frame providing an opening adapted to receive the horn of the head, cutting means mounted for reciprocation across said opening, power means for operating said cutting means, a hood mounted on said frame for movement over and away from said horn-receiving area, means actuated by the hood in the closing thereof for supplying heated sterilizing fluid to said area when said hood is over said area, and means adjacent the cutting means for cooling said area.

4. In apparatus for dehorning cattle heads and the like, a frame providing an opening adapted to receive the horn portion of the head, cutting means mounted for reciprocation with respect to said opening, power means associated with said cutting means for operating said cutting means, a hood mounted on said frame for movement over and away from said horn-receiving area, means actuated by the hood in the closing thereof for supplying hot fluid to said area when said hood is over the same, and means actuated by movement of the hood for supplying a cooling liquid to said area when said hood is raised.

5. In apparatus for dehorning cattle heads and the like, a frame providing an opening adapted to receive the horn portion of the head, cutting means mounted for reciprocation with respect to said opening, power means for operating said cutting means, a hood mounted on said frame for movement over and away from said horn-receiving area, a valve-controlled pipe for supplying hot fluid to said area when said hood is in lower position, means actuated by said hood for opening said valve when said hood is lowered and for closing said valve when said hood is raised, and means actuated by movement of the hood to raised position for cooling said area.

6. In apparatus for dehorning cattle heads and the like, a frame providing an opening adapted to receive the horn portion of the head, cutting means mounted for reciprocation with respect to said opening, power means for operating said cutting means, a hood mounted on said frame for movement over and away from said horn-receiving area, means for supplying hot fluid and for supplying cooling fluid to said area, and means actuated by said hood for supplying hot fluid to said area when said hood is lowered and for supplying cooling fluid to said area when said hood is raised.

7. In apparatus for dehorning cattle heads and the like, a frame providing an opening adapted to receive the horn portion of the head, cutting means mounted for reciprocation with respect to said opening, power means for operating said cutting means, a hood mounted on said frame for movement over and away from said horn-receiving area, and means actuated by said hood for supplying hot fluid and cooling fluid successively to sterilize and then cool said area.

8. In apparatus for shearing cattle heads and the like, a frame providing an opening adapted to receive the horn-bearing portion of the head, power-operative means for shearing away the horn-bearing portion of the head, a hood supported for movement to a position about said opening and also for movement away from said opening, and means mounted on said frame for applying hot fluid and cooling fluid to said opening area of the frame after the horn-bearing portion of the head on each side thereof has been removed.

9. In apparatus for shearing cattle heads and the like for the removal of horn portions, a frame providing an opening adapted to receive the horn-bearing portion of the head, means mounted on said frame for shearing away such portion of the head, a hood mounted on said frame for movement over and away from said head-receiving area, and means mounted on said frame for supplying hot fluid and cooling fluid successively to said area after the horn-bearing portions of the head have been removed.

10. In apparatus for shearing cattle heads and the like for the removal of horn portions, a frame providing an opening adapted to receive the horn-bearing portion of the head, means mounted on said frame for shearing away such portion of the head, a hood mounted on said frame for movement over and away from said head-receiving area, and means actuated by said hood for supplying hot fluid and cooling fluid successively to said area after the horn-bearing portions of the head have been removed, said hot fluid supplying means being rendered operative by the lowering of said hood.

11. In apparatus for shearing cattle heads and the like for the removal of horn portions, a frame providing an opening adapted to receive the horn-bearing portion of the head, a hood mounted on said frame for movement over and away from said head-receiving area, and means controlled by said hood for supplying hot fluid and cooling fluid successively to said area after the horn-bearing portions of the head have been removed, said means for supplying cooling fluid being rendered operative by the raising of said hood.

12. For use with a shearing means mounted upon a frame, a hood movably mounted on said frame for movement to an enclosing position about the shearing means and to a position away from said shearing means, spray nozzles mounted upon said frame for directing fluid upon said shearing means, valve-controlled means for supplying hot fluid to one of said nozzles and cold fluid to one of said nozzles, and connections between said hood and said valve-controlled means for spraying hot fluid upon said shearing means when the hood is closed and cold fluid upon said shearing means when the hood is moved away from said bearing means.

JAMES BLACK.

REFERENCES CITED

The following references are of record in the file of this patent:

UNITED STATES PATENTS

| Number | Name | Date |
| --- | --- | --- |
| 503,617 | Rader | Aug. 22, 1893 |
| 988,140 | Phillips | Mar. 28, 1911 |
| 1,056,046 | Myers | Mar. 18, 1913 |
| 1,778,034 | Mapes | Oct. 14, 1930 |
| 2,257,245 | Rudolph | Sept. 30, 1941 |